United States Patent
Dziedzic et al.

[19]

[11] Patent Number: 6,111,211

[45] Date of Patent: Aug. 29, 2000

[54] FILL LEVEL SENSOR FOR GRANULAR MATERIAL

[75] Inventors: Joseph H. Dziedzic, Addison; Raymond J. Schaeffer, Lake Zurich, both of Ill.

[73] Assignee: AEC, Inc., Wood Dale, Ill.

[21] Appl. No.: 09/440,775

[22] Filed: Nov. 16, 1999

[51] Int. Cl.[7] .................................................. H01H 35/00
[52] U.S. Cl. ................................................................ 200/61.2
[58] Field of Search .............................. 177/60, 63, 66; 200/61.2, 61.21, 61.41, 61.42; 222/52, 64–66, 199, 409, 544, 545, 556–560; 340/612, 615, 616, 617, 627; 414/294, 304, 323

[56] References Cited

U.S. PATENT DOCUMENTS

| | | | |
|---|---|---|---|
| 848,519 | 3/1907 | Versteeg | 200/DIG. 8 |
| 1,111,464 | 9/1914 | Ibberson | 200/535 |
| 1,298,950 | 4/1919 | Hull | 340/617 |
| 2,376,304 | 5/1945 | Anderson | 214/17 |
| 2,714,472 | 8/1955 | Richardson | 222/63 |
| 2,754,995 | 7/1956 | Switzer | 222/63 |
| 2,826,654 | 3/1958 | Conkling | 200/61.21 |
| 2,902,188 | 9/1959 | Tarukawa | 222/63 |
| 2,913,710 | 11/1959 | Barber et al. | 340/246 |
| 2,963,201 | 12/1960 | Westlin | 222/63 |
| 3,010,160 | 11/1961 | Lytton et al. | 19/69 |
| 3,019,310 | 1/1962 | Hoff | 200/61.21 |
| 3,542,982 | 11/1970 | Gruber | 200/61.21 |
| 3,685,356 | 8/1972 | Zimmerman | 73/290 |
| 3,831,159 | 8/1974 | Parsons | 340/246 |
| 3,847,303 | 11/1974 | Szendroi et al. | 222/66 |
| 3,908,133 | 9/1975 | Hartley | 307/118 |
| 4,201,315 | 5/1980 | Chuss et al. | 222/66 |
| 4,378,897 | 4/1983 | Kattelmann | 222/56 |
| 4,583,663 | 4/1986 | Bonerb | 222/61 |
| 4,662,182 | 5/1987 | Tsukiyama et al. | 62/137 |
| 4,993,232 | 2/1991 | Tatematsu et al. | 62/137 |
| 5,048,333 | 9/1991 | Bonnell et al. | 73/290 R |
| 5,261,743 | 11/1993 | Moller | 222/63 |
| 5,423,455 | 6/1995 | Ricciardi et al. | 222/1 |
| 5,656,325 | 8/1997 | Wallace | 427/8 |
| 5,806,441 | 9/1998 | Chung | 110/185 |

*Primary Examiner*—Michael Friedhofer
*Attorney, Agent, or Firm*—McEachran, Jambor, Keating, Bock & Kurtz

[57] ABSTRACT

A sensor switch for controlling the fill level of granular material filled into a container in which the sensor may either be mounted adjacent a fill path of the container or at a separate location. The sensor includes an elongated arm pivotally attached to a bracket for operating a switch located within the bracket. The sensor may be adjustably mounted on an elongated, remote support member mounted either to the side walls or to the top of the container. The sensor may have three operating positions including an initial position, an actuated position in which the arm actuates the switch, and a third position in which the arm releases the switch.

13 Claims, 6 Drawing Sheets

FILL LEVEL SENSOR FOR GRANULAR MATERIAL

BACKGROUND OF THE INVENTION

There are several industrial applications which require the level of a flowable solid material such as a granular material in a container to be maintained within predetermined limits. One example is the input chamber of a plastic molding machine, in which a constant supply of granular plastic should be maintained. Another example of an application of this sort is a silo used for grain storage. In this application there should be no filling of the silo, with grain, above a given level. Other examples are too numerous to mention.

In any such application, the input of flowable material, once initiated, should be stopped once a particular level is reached. For effective operation, the interruption should be automatic, and there should be an automated means to resume filling whenever the level of the flowable mass is reduced below some minimum. This entails a sensor to determine the level of filling in the container, and use of such determination to control fill operations.

Many such sensors have been proposed, but not all are really satisfactory. The sensor should be independent of any aspect or quality of the flowable material, and independent of the filling device or system in which the filling device is installed since the material involved may change substantially and the position of the discharge seal may be oriented incorrectly. The sensor should be simple and reliable, capable of long life, without regard to frequency of use or change of material. Further, the sensor should be readily and quickly adaptable to changes in the level requirements of the comprehensive system in which it is employed. Additionally, the sensor must be capable of operations in environments in which the temperature may be as high as 400° F. Prior sensors have generally failed in one or more such respects.

SUMMARY OF THE INVENTION

It is an object of the present invention, therefore, to provide a new and improved sensor for controlling the fill level of a container to be filled with flowable solid materials such as granular materials, which sensor is independent of the specific characteristics of the flowable material or the device filling the container.

Another object of the invention is to provide a new and improved flowable material fill level sensor that is simple, yet reliable in operation and is adaptable to various types of material handling systems.

Accordingly, the invention relates to a sensor assembly for control of the fill level of flowable material filled into a container. The sensor assembly comprises a bracket located at a fixed position adjacent a material fill path for the container; a sensor switch mounted on the bracket; a sensor arm pivotally mounted on the bracket in alignment with and engageable with the sensor switch; and a sensor element, projecting from the sensor arm and actuated by material moving into the container along the fill path. The sensor element and its sensor arm have three operating positions:

A. an initial position in which the sensor switch is in an initial operating condition, shown particularly in FIGS. 1 and 5, B. an actuated second position in which the sensor arm actuates the sensor switch to a second operating condition, different from its initial operating condition, and then maintains the sensor switch in its second operating condition; and C. a third position in which the sensor arm senses the filled condition of the container.

DESCRIPTION OF THE PREFERRED EMBODIMENTS

Figure 1:
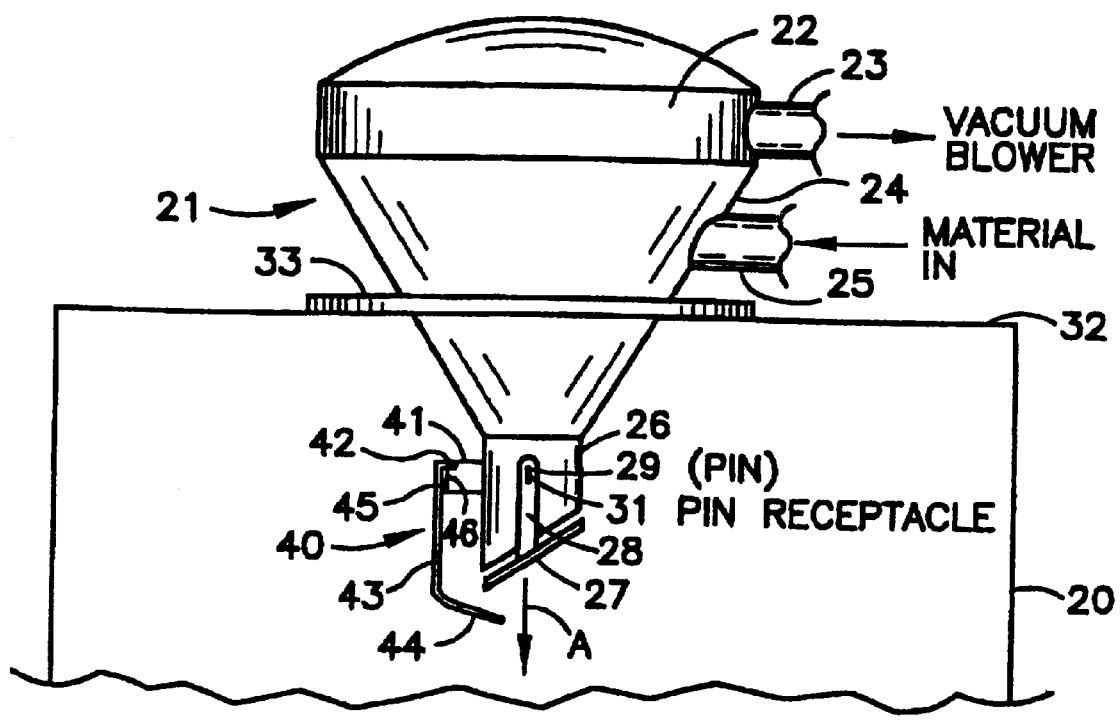
FIG. 1 is a partly schematic view, partly in cross-section, illustrating a first operating condition for a sensor switch assembly constructed in accordance with the invention.

FIGS. 1–5 show a conventional container 20 to be filled with a flowable solid material such as a granular material. Container 20 may comprise the input chamber for a plastic molding or extrusion machine, or may be any other container in which a supply of flowable material is to be deposited. Container 20 is to be filled with flowable material from a storage supply (not shown) by means of a vacuum receiver 21. A vacuum blower (not shown) is connected to an upper cylindrical portion 22 of the receiver by an air outlet 23. A lower conical portion 24 of receiver 21 is connected to the upper portion 22 of vacuum receiver 21; the material inlet for receiver 21 is indicated at 25, in the lower portion 24 of receiver 21. Although, I have referred to device 21 as a receiver, I have done so only for conciseness of explanation and not be way of limitation.

The lower conical portion 24 of receiver 21, in the form shown in FIGS. 1–5, is connected to a cylindrical material outlet 26 that forms a part of the receiver. The lower, beveled end of outlet 26 is located in container 20, usually in the upper part of the container as shown. Outlet 26 can be closed by a gate 27 that is slidably and pivotally mounted on the outlet by means of a pair of arms 28 (only one arm 28 appears in each of FIGS. 1–5) each slidably mounted on a support/pivot pin 29. There is a pin receptacle 31 in each of the arms 28; each pin receptacle is elongated vertically so that gate 27 can slide (move linearly) in a vertical direction relative to outlet 26. Receiver 21 is mounted on the lid or cover 32 of container 20, preferably in a central location relative to the container, by means of a mounting plate 33.

As thus far described, vacuum receiver 21 and container 20 are quite conventional; their construction and operation are well known. However, outlet 26 of vacuum receiver 21 includes a sensor switch assembly 40, constructed in accordance with the present invention, which is novel and unobvious.

Figure 2:
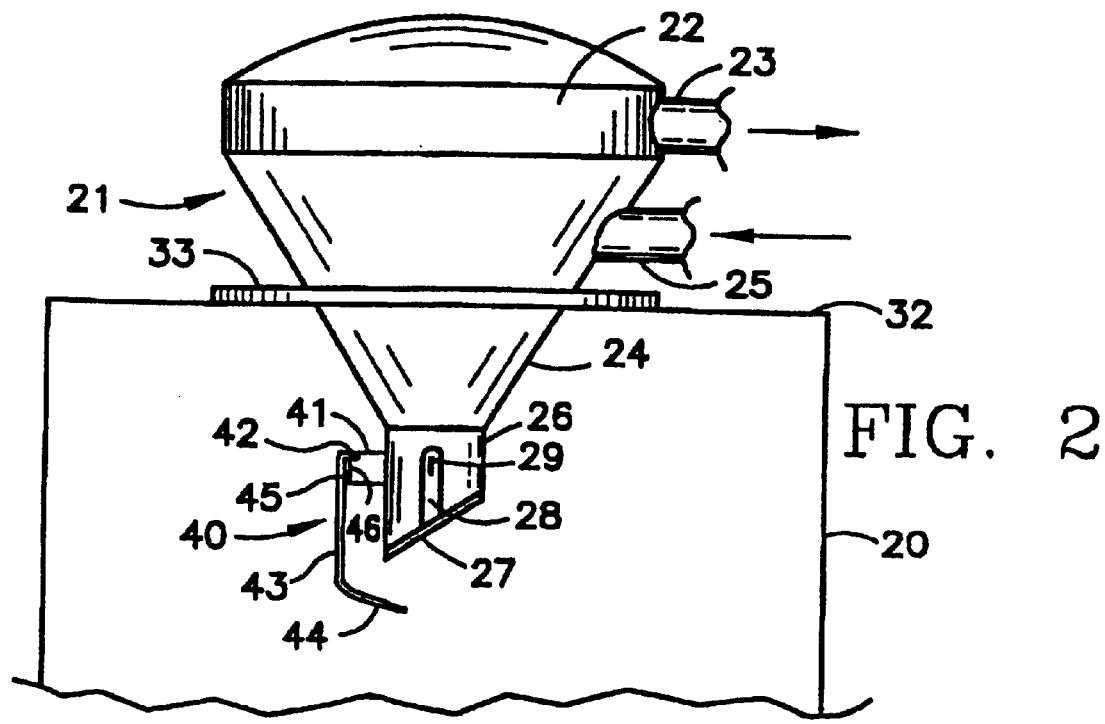
FIGS. 2, 3, 4 and 5 are partly schematic views, partly in cross-section, similar to FIG. 1, illustrating a sequence of further operating conditions for the invention.
Figure 8:
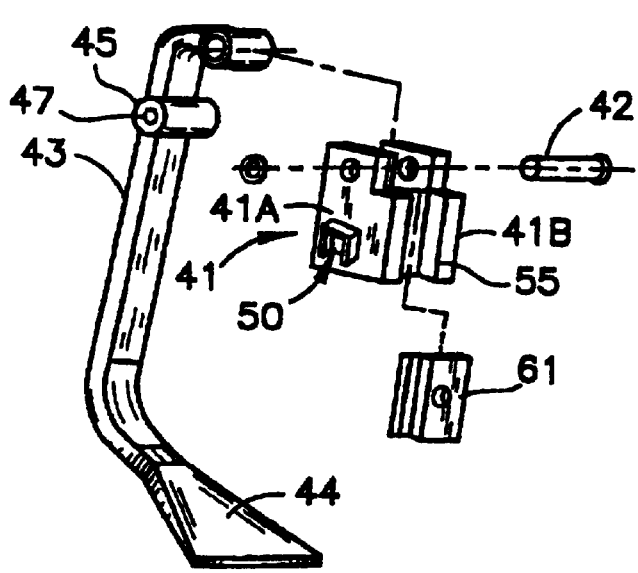
FIG. 8 is an exploded view of principal operating elements of the preferred embodiment of the invention shown in FIG. 7.
Figure 9:
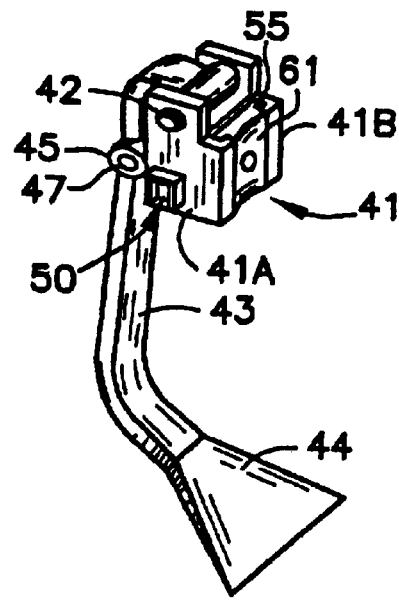
FIG. 9 illustrates the apparatus of FIG. 8 in assembled condition.

The sensor switch assembly 40, shown in its environment in FIG. 1 and in detail in FIGS. 8 and 9, includes an inverted U-shaped bracket 41, which is mounted on the material outlet 26 of vacuum receiver 21. Accordingly, the bracket 41 is located adjacent but out of the fill path, indicated by arrow A in FIG. 1, for the container 20. A sensor switch 50, preferably a magnetic reed switch is potted in the bracket 41 in the manner shown in FIGS. 8 and 9. Bracket 41 includes two arms, 41A and 41B, only one of which is shown in many of the drawing figures; a pin 42 seated in arms 41A and 41B extends across the bracket near its upper outer end and serves as a pivotal support for a sensor arm 43. The curved lower end of sensor arm 43 terminates in a fan-shaped sensor element 44 positioned to project into fill path A (see FIG. 4) in position to be deflected by the flowable material flowing along the fill path (arrow A) into container 20. There is a tubular stop member 45, most clearly shown in FIGS. 8 and 9, formed in the upper end of sensor arm 43 in position to engage a wall 46 forming the lower portion of the U-shaped bracket 41. This wall 46 functions as a stop member for the tubular stop member 45 of the sensor arm 43. Stop members 45 and 46, when engaged, hold arm 43 and its end element 44 in its initial position, as shown in FIGS. 1, 2 and 5. A magnet 47 is potted in the tubular stop member 45 to activate and deactivate the sensor switch 50 by reacting with the reed switch 50 potted in the bracket 41. The sensor switch assembly is suitable for operation in high temperature environments, up to about 400° F., due to the fact that the sensor arm and its mounting bracket are formed of a glass reinforced plastic such as a nylon. If it is necessary for the sensor switch to function in environments above 400° F., other suitable materials may be used. The magnet, and magnetic reed switch activated by the magnet, are potted in the arm and bracket, respectively, and thus are enclosed and protected from heat and dust.

Figure 10:
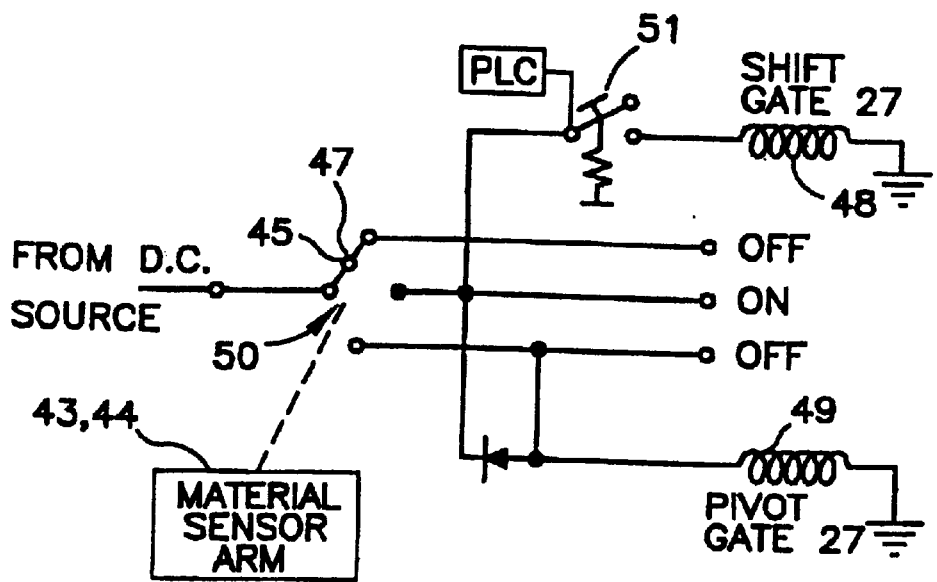
FIG. 10 is a schematic of one possible control switch circuit for the invention.

Operation begins with the apparatus in the position shown in FIG. 1, which illustrates the OFF condition. The sensor switch 50 mounted in the bracket 41 is in its initial state, a no-flow or OFF condition for filling of material into container 20. Switch 50 may be a normally open switch or a normally closed switch, utilizing a single pole, double throw switch, depending on the design and on the requirements of the overall system in which container 20 and hopper 21 are incorporated; the circuit shown in FIG. 10 is exemplary only.

Next, the operating mechanism (shown as switch 51, FIG. 10) which conventionally is what is called a programmed logic circuit (labeled as PLC in FIG. 10) for gate 27 is actuated momentarily, usually by a system operator; this energizes a solenoid 48 that lifts arms 28 and gate 27 to the position shown in FIG. 2. Gate 27 closes blocking the material outlet 26. There is no flow of material into container 20. However, a vacuum is "drawn" in the interior of vacuum hopper 21 so that the hopper, at least in its lower conical portion 24, fills with flowable material derived through its material inlet 25. The material is taken from an external source (not shown).

Figure 3:
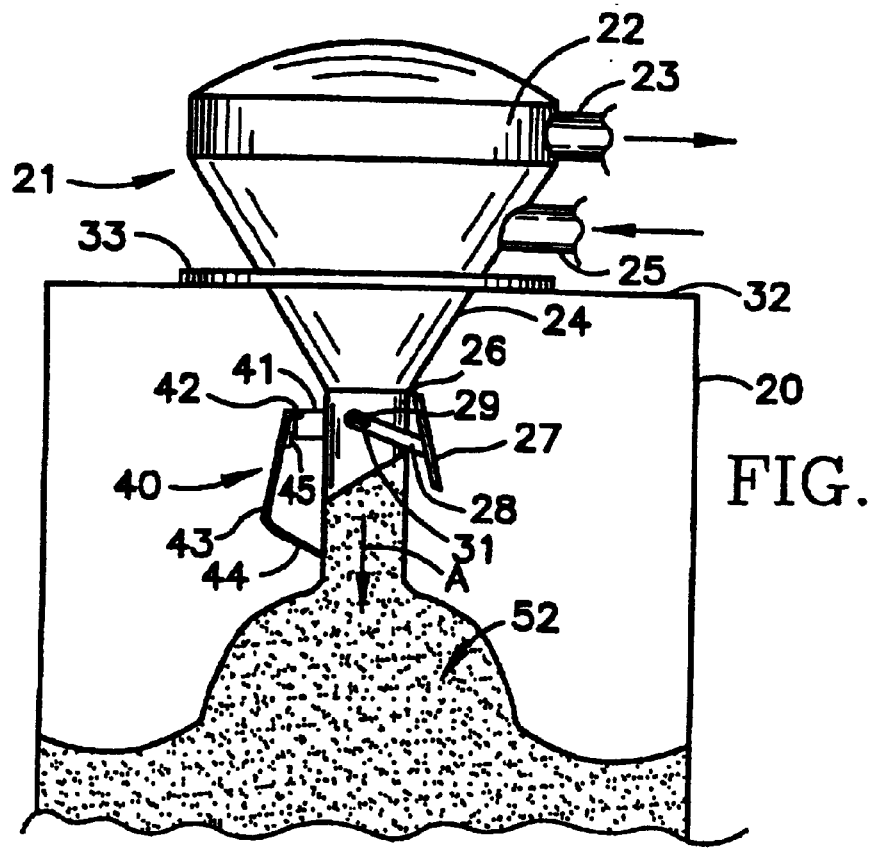

At this point, when it is desired to deposit material in container 20, sensor switch 50 is actuated to energize another solenoid 49; gate 27 of material outlet 26 is thus moved pivotally to the position shown in FIG. 3. It should be understood that solenoids 48 and 49 are exemplary embodiments of the controls of this invention and are subject to change, and may be replaced by any preferred actuator. Any preferred form of positioning devices for gate 27 may be employed, as desired. The movement of gate 27 opens the bottom of the material outlet 26, allowing gravity discharge of material along the fill path (arrow A, FIGS. 1, and 3) into container 20. This movement of material creates a buildup or "pile" of material in container 20; the material to accumulate as a mass 52 (FIG. 3). The downward flow of material, along path A, engages the fan-shaped sensor element 44 and deflects sensor arm 43 away from the material flow to the position shown in FIG. 3, actuating the sensor switch 50 of the assembly (see FIG. 10) to indicate that there is a flow of material being accumulated in container 20 in a pile or mass 52.

Figure 4:
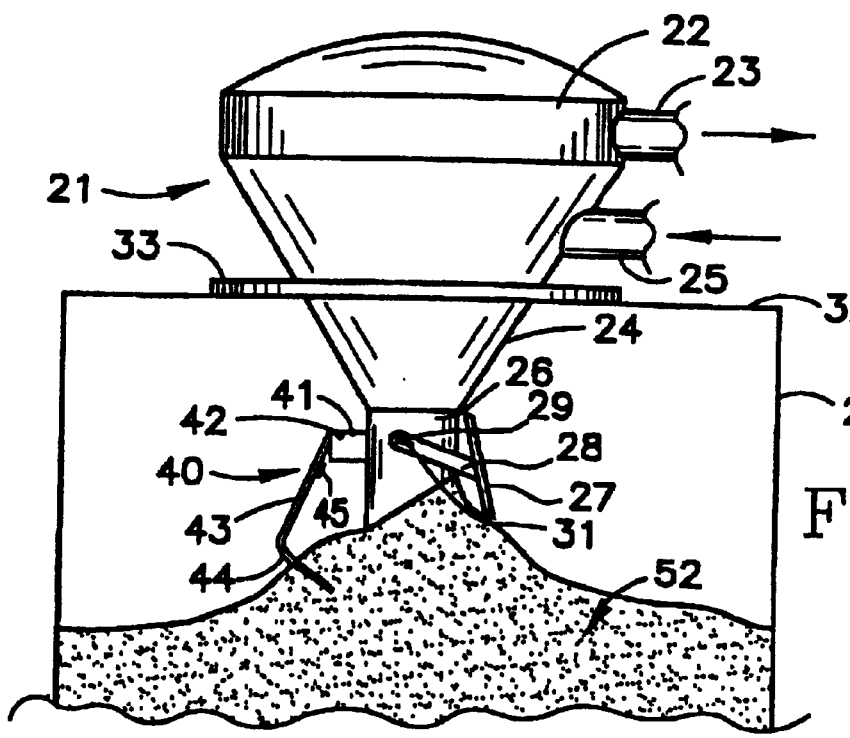
Figure 5:
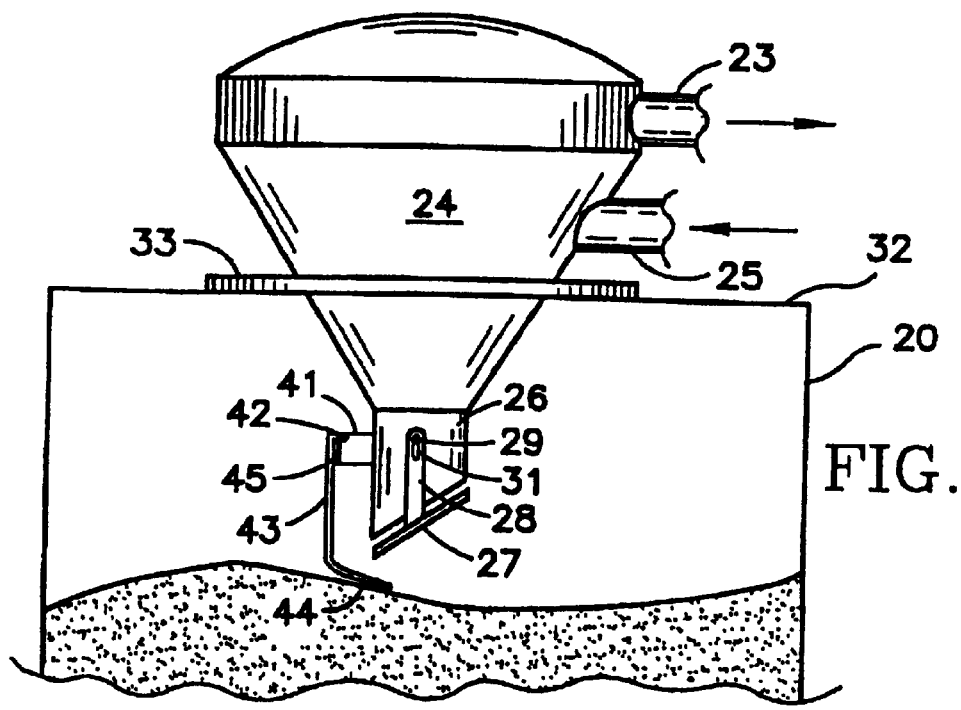

The operation as thus far described is repeated, usually at least once, until the level of the accumulated material in mass 52 in container 20 reaches the lower end of outlet 26, as shown in FIG. 4. This is the maximum level desired in container 20. The bent sensor element, e.g., the lower part 44 of sensor arm 43, is partially buried in the material of mass 52 and the mass of material prevents counter-clockwise rotation of the sensor arm. Because the sensor element 44 has moved clockwise relative to bracket 41, the field of the magnet 47 no longer influences the reed switch 50 so the sensor switch is deactuated by a timer in the programmed logic circuit; further filling is interrupted until the level in container 20 is reduced by operation of the overall system in which it functions. When the level of material in mass 52 is low enough, the situation as is illustrated in FIG. 5; it is much the same situation as is shown in FIG. 1. The system is now ready to actuate the gate 27 and start over. Thus, the sensor switch 50 of FIG. 10, actuated by the fan-shaped sensor element 44 and its support arm 43, can maintain a relatively constant level for the mass of material accumulated in container 20.

Figure 6A:
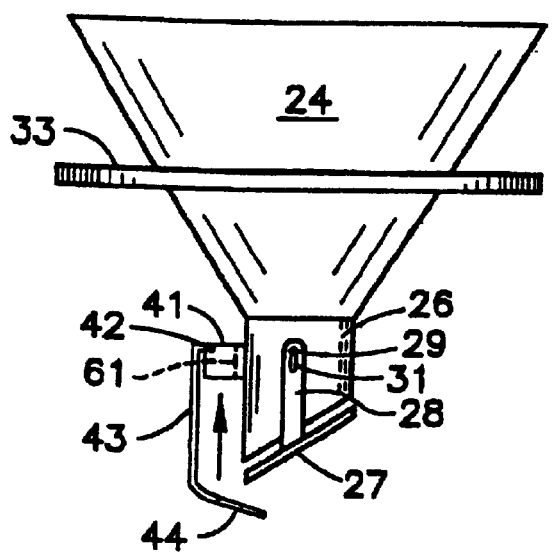
FIGS. 6A and 6B are partly schematic views, similar to FIG. 1, illustrating another feature of the invention.
Figure 6B:
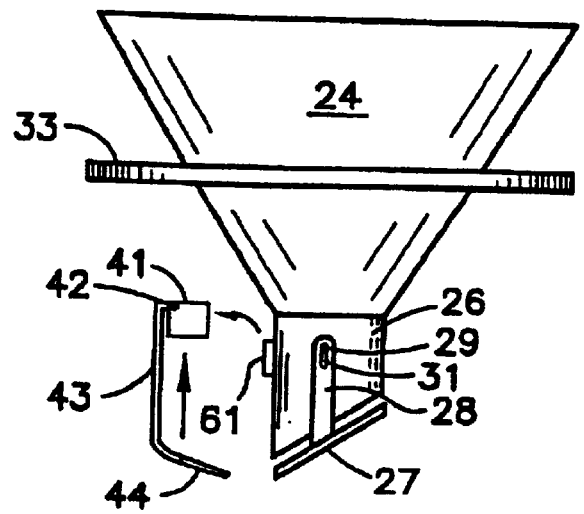

FIGS. 6A and 6B illustrate another feature of the invention in general with some details more clearly shown in FIGS. 8 and 9. In FIGS. 6A and 6B, the bracket 41 from which sensor arm 43 and its sensor element 44 are suspended, is formed with two aligned rabbeted slots 55 in two spaced arms 41A and 41B of the bracket 41; as shown in detail in FIGS. 8 and 9. The rabbeted slots 55 which taper downwardly telescope onto a complimentary shaped mounting clip 61 which tapers upwardly and which is mounted on outlet 26. Thus, if a different configuration for the sensor element 44 is desired, or some other change in sensor arm 43 is deemed necessary, it is a simple matter to lift the bracket 41 from the clip 61 (see FIGS. 6B and 8) and replace the entire sensor arm bracket 41.

Figure 7:
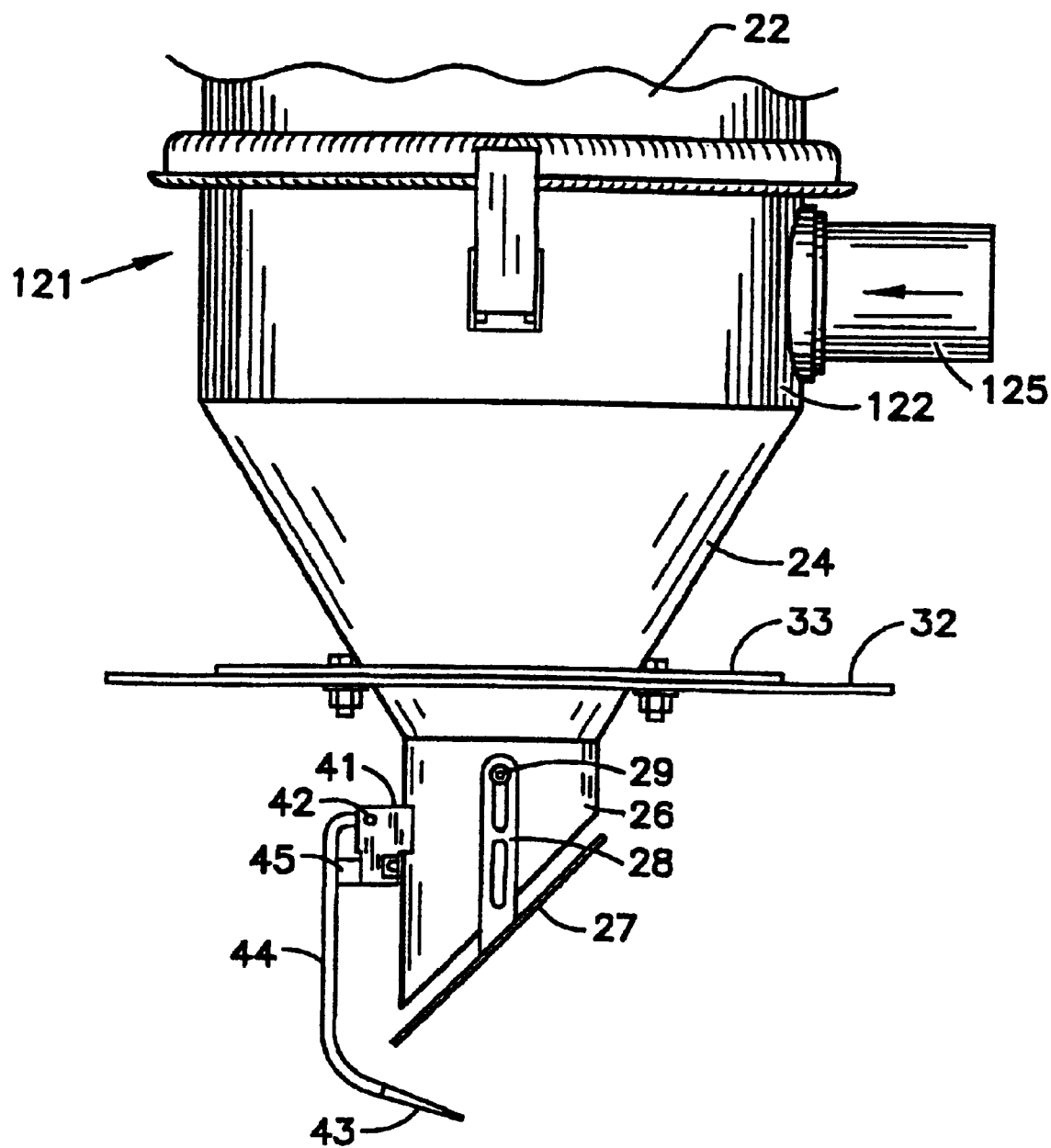
FIG. 7 is a detail view of a preferred embodiment of the invention.

FIG. 7 affords a more complete view of a somewhat modified embodiment of the invention. The reference numerals for many components of the assembly remain unchanged, because those components may be the same as for the embodiments of FIGS. 1–6. Thus, the apparatus of FIG. 7 includes the lower portion 24 of a vacuum hopper 121, which has an upper vacuum portion 22 and a lower material feed portion 24. In the construction shown in FIG. 7, however, there is a cylindrical section 122 of the lower feed portion 24, located between hopper portions 22 and 24. The material input to hopper portion 24 is through an inlet 125, which connects section 122 of the lower material input portion 24 of hopper 121 to a granular material supply (not shown).

Figure 11:
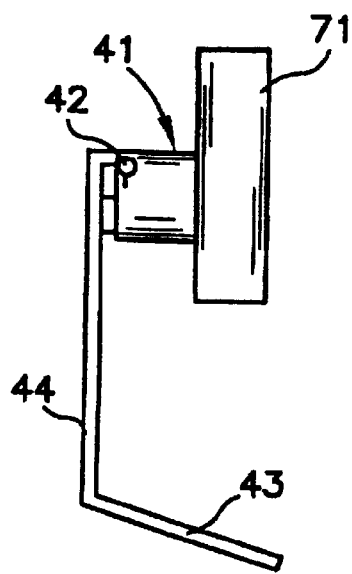
FIG. 11 is a side elevational view of a modified support for the switch assembly which permits vertical adjustment of the switch assembly.
Figure 12:
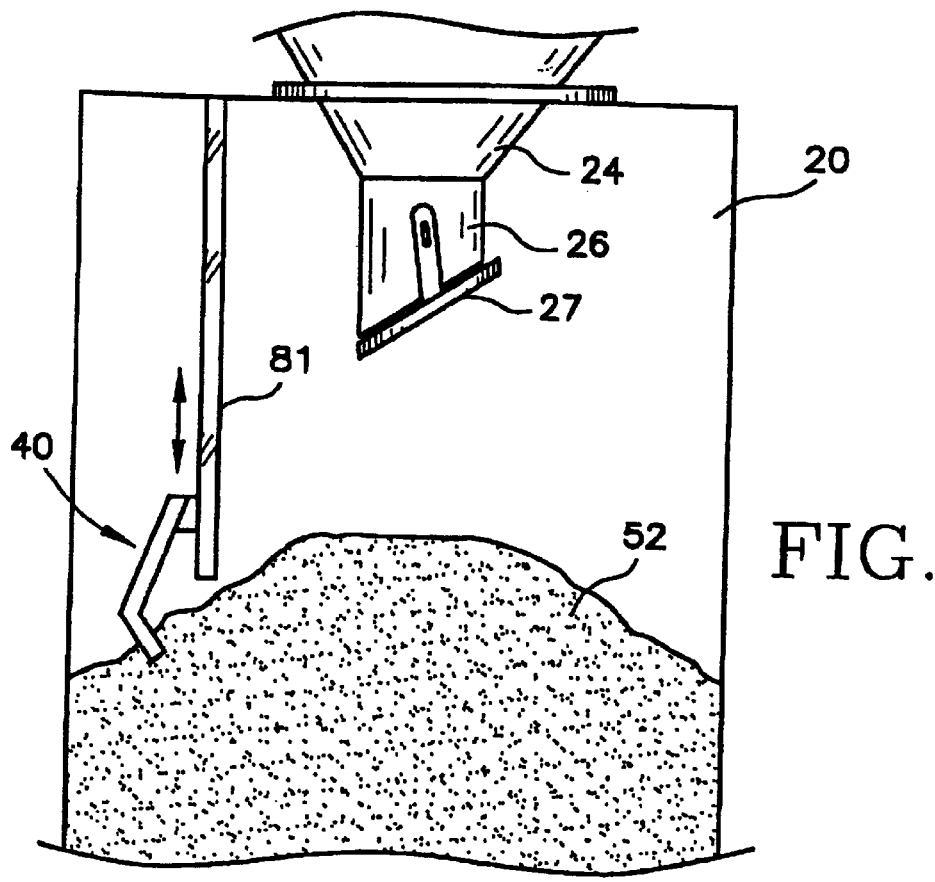
FIG. 12 is a partial side elevational view similar to FIG. 3 showing another modified form of the invention in which a remote support for the switch assembly is locatable within the material container.

Whereas, in one embodiment of this invention the sensor assembly 40 is attached to the wall of a discharge nozzle 26 supplying flowable material to the container 20, the novel construction of the sensor assembly permits it to be mounted in almost any desired position in which the fan-shaped end portion 44 of the sensor arm 43 may engage the stream of flowable material discharging from the nozzle 26. In one aspect of the invention, this objective can be accomplished by mounting the sensor on an adjustable bracket. By adjustable bracket it is meant either a bracket that can be relocated relative to a support such as material outlet 26 or a support on which the switch bracket 41 may be moved along the length of the mounting support 71 shown in FIG. 11. The adjustable bracket can be located so as to position the end 44 of the sensor arm 43 in a desired position. While the primary purpose of the sensor of this invention is to detect the flow of the material into a container as well as to react to any change in the height of the mass of material in the container, the sensor is also adaptable to react to changes in the height of the material mass without being located where it is engaged by the flow of material into a container. In other words, the sensor of this invention can be mounted on the inside wall of a container away from where the filling material enters the container. This arrangement is shown in FIG. 12 of the drawings. A remote support 81 is locatable with the container 20 out of engagement with the flow of material into the container 20 from the discharge nozzle 26. As shown, the remote support 81 can be attached to the lid or cover 32 of the container 20. The switch assembly 40 can be adjusted vertically along the length of the remote support 81 to establish the height of the accumulated mass 52. The remote support 81 is particularly important in situations where the apex of the mass 52 of the filling material is to be located below the gate 27.

The attachment of the sensor arm to its bracket with the curved end portion 44 of the sensor arm extending under the pivotal connection of the arm to its bracket, insures that upward movement of flowable material which, by nature, moves outwardly from the apex of a mass of the material will tend to rotate the sensor arm and move the magnet and its field out of the magnetic range of the reed switch which is potted in the bracket. Due to the shape of the sensor, it is important that it be mounted so that its fan-shaped end 44 is oriented to face towards the mass of flowable material to enable the end 44 to dig in the flowable material as the height of the mass of the flowable material increases. Because of the manner of mounting the arm to the bracket, and because of the curvature of the arm, the arm naturally swings back into contact with the bracket when it is not contacting material. The end portion 44 of the arm 43 extends beneath the bracket in its free hanging position to provide a center of gravity for the arm 43 which holds its tubular stop 45 against the wall 46 of the U-shaped bracket 41.

The remainder of the apparatus shown in FIG. 7, below mounting plate 33 and the cover (lid) 32 for the container on which that apparatus is mounted, is not changed from that shown in FIG. 1. Thus, it includes the cylindrical material outlet 26, the gate 27, the suspension arms 28 (one shown) for gate 27, and the pivot pin 29 for arms 28. As before, gate 27 can be moved both vertically and pivotally. The sensor switch for this embodiment is mounted between two fixed arms 41A and 41B of the bracket 41 extending from outlet 26. A sensor end portion 44 projects into the path of material flowing downwardly from outlet 26; portion 44 is the end of a curved sensor arm 43 supported on a pivot pin 42 that engages in slots 55 (one shown) in bracket 41.

What is claimed is:

1. A sensor switch assembly for control of the fill level of granular material filled into a container, said sensor switch assembly comprising:

a bracket located at a fixed position adjacent a material fill path for the container;

a sensor switch mounted on said bracket;

a sensor arm pivotally mounted on said bracket in alignment with and engageable with said sensor switch; and a sensor element, projecting from said sensor arm and actuated by material moving into said container along said fill path, said sensor element and said sensor arm having three operating positions:
　　A. an initial position in which said sensor switch is in an initial operating condition,
　　B. an actuated second position in which said sensor arm actuates said sensor switch to a second operating condition, different from the initial operating condition, and maintains said sensor switch in the second operating condition, and
　　C. a third position in which said sensor arm releases said sensor switch.

2. The sensor of claim 1 in which said sensor arm includes a curved end portion remote from said pivotal mounting, said end portion is somewhat fan-shaped and extends laterally beyond and below said bracket when said arm is in said first position.

3. A sensor for detecting changes in the height of a mass of flowable material, said sensor including:

a bracket, an elongated arm pivotally mounted on a top of said bracket and depending from said pivotal mounting to extend alongside said bracket in a first position, said elongated arm being pivotally movable from said first position to a second position in which the elongated arm is located away from said bracket, a switch positioned in said bracket, and a switch actuator positioned in a portion of said arm which locates said actuator in an actuating relation to said switch when said arm is in said first position and locates said actuator in a non-actuating position relative to said switch when said arm is in the second position.

4. The sensor of claim 3 which a tubular shaped stop is formed integral with said arm, said stop is located to engage said bracket when said arm is in said first position and said switch actuator is housed in said tubular shaped stop.

5. The sensor of claim 4 in which said switch is a magnetic reed switch and said switch actuator is a magnet.

6. The sensor of claim 5 in which said bracket containing said switch and said portion of said arm in which said switch actuator is located are formed of a glass reinforced plastic which protects said switch and said switch actuator against ambient temperatures up to about 400° F.

7. The sensor of claim 3 in which said bracket is formed with an upwardly converging rabbeted slot, a complimentary shaped upwardly converging clip slides into said slot and a fastener supports said clip.

8. A mounting assembly for adjusting the location and height of a sensor switch for control of the fill level of a granular material introduced into a container having side walls and a top cover through a discharge nozzle, comprising:

an elongated remote support member attached to one of said side walls and said top cover of said container to extend vertically relative to said container at a selected location remote from said discharge nozzle, a bracket mounted on said elongated remote support member for vertical movement along said support member, said bracket being securable at selected locations along said remote support member, an elongated arm pivotally mounted on the top of said bracket and depending from said pivotal mounting to extend alongside said bracket in a first position, said elongated arm being pivotally movable from said first position to a second position in which the elongated arm is located away from said bracket, a switch positioned in said bracket, and a switch actuator positioned in a portion of said arm which locates such actuator in an actuating relation to said switch when said arm is in said first position and locates said actuator in a non-actuating position relative to said switch when said arm is in the second position.

9. The mounting assembly of claim 8 in which said elongated arm includes a curved end portion remote from said pivotal mounting, said end portion is somewhat fan-shaped and extends laterally beyond and below said bracket when said arm is in said first position.

10. The mounting assembly of claim 9 in which a tubular shaped stop is formed integrally with said arm, said stop is located to engage said bracket when said arm is in said first position and said switch actuator is housed in said tubular shaped stop.

11. The mounting assembly of claim 10 in which said bracket containing said switch and said portion of said arm in which said switch actuator is located are formed of a glass reinforced plastic which protects said switch and said switch actuator against ambient temperatures up to about 400° F.

12. The mounting assembly of claim 9 in which said bracket is formed with an upwardly converging rabbeted slot, a complimentary shaped upwardly converging clip slides into said slot and a fastener supports said clip.

13. The mounting assembly of claim 8 in which said switch is a magnetic reed switch and said switch actuator is a magnet.

* * * * *